United States Patent
Kim et al.

(10) Patent No.: US 8,973,704 B2
(45) Date of Patent: Mar. 10, 2015

(54) VIBRATION ABSORBING MOUNTING DEVICE

(71) Applicants: Hyundai Motor Company, Seoul (KR); Kia Motors Corporation, Seoul (KR); Pyung Hwa Industrial Co., Ltd., Daegu (KR)

(72) Inventors: Hyo Seok Kim, Gwangmyeong-si (KR); Seung Jae Park, Seongnam-si (KR); Myung Han Kim, Daegu (KR); Jong Su Park, Daegu (KR)

(73) Assignees: Hyundai Motor Company, Seoul (KR); Kia Motors Corporation, Seoul (KR); Pyung Hwa Industrial Co., Ltd., Daegu (KR)

( * ) Notice: Subject to any disclaimer, the term of this patent is extended or adjusted under 35 U.S.C. 154(b) by 0 days.

(21) Appl. No.: 14/084,478

(22) Filed: Nov. 19, 2013

(65) Prior Publication Data
US 2014/0367192 A1    Dec. 18, 2014

(30) Foreign Application Priority Data
Jun. 18, 2013   (KR) .................. 10-2013-0069846

(51) Int. Cl.
F16F 7/00    (2006.01)
F16F 15/023  (2006.01)

(52) U.S. Cl.
CPC .................... F16F 15/023 (2013.01)
USPC ........................................... 181/207

(58) Field of Classification Search
USPC ........................................... 181/207
See application file for complete search history.

(56) References Cited

U.S. PATENT DOCUMENTS

| 4,702,346 | A  | * | 10/1987 | Uno et al. | 181/207 |
| 6,561,312 | B2 | * | 5/2003  | Stanienda | 181/207 |
| 2001/0037911 | A1 | * | 11/2001 | Stanienda | 181/207 |
| 2005/0218570 | A1 | * | 10/2005 | Ueki | 267/140.11 |
| 2005/0218734 | A1 | * | 10/2005 | Tahara et al. | 310/90 |
| 2013/0001843 | A1 | * | 1/2013 | Kanaya | 267/140.14 |
| 2013/0161885 | A1 | * | 6/2013 | Marienfeld et al. | 267/140.14 |
| 2014/0145383 | A1 | * | 5/2014 | Yasuda et al. | 267/140.13 |

FOREIGN PATENT DOCUMENTS

| JP | 9-79306 A       |   | 3/1997 |
| JP | 10047427        | * | 2/1998 |
| JP | 10-89402        | * | 4/1998 |
| JP | 10-246277 A     |   | 9/1998 |
| KR | 10-2010-0105457 A |   | 9/2010 |

* cited by examiner

Primary Examiner — Forrest M Phillips
(74) Attorney, Agent, or Firm — Morgan, Lewis & Bockius LLP

(57) ABSTRACT

A vibration absorbing mounting device may include an outer housing, a mounting shaft, a core, a first nozzle valve spaced apart from and disposed below the core, an inner housing spaced apart from one side and the other side of the core, with the first nozzle valve being mounted to the inner housing, and a chamber separator fixed to the core and brought into close contact with and sliding on the first nozzle valve, wherein the chamber separator forms a first chamber and a second chamber, and an elastic member formed between the core and the inner housing and between the inner housing and the outer housing, wherein fluid is filled in the first chamber and the second chamber, and a first nozzle fluidly-connecting the first and second chambers is formed in the first nozzle valve.

8 Claims, 4 Drawing Sheets

VIBRATION ABSORBING MOUNTING DEVICE

CROSS-REFERENCE TO RELATED APPLICATION

The present application claims priority to Korean Patent Application No. 10-2013-0069846 filed on Jun. 18, 2013, the entire contents of which is incorporated herein for all purposes by this reference.

BACKGROUND OF THE INVENTION

1. Field of the Invention

The present invention relates to a vibration absorbing mounting device which efficiently attenuates horizontal and vertical vibrations generated from a source of vibration such as an engine and has a simple structure.

2. Description of Related Art

In general, a vehicle is equipped with a vibration/noise absorbing mounting device, between the engine and the vehicle body, in order to improve have better vibration and noise characteristics.

Although increasing the modulus of elasticity of the mounting device can reduce vibration and noise when the engine is idle, it generates secondary vibration that makes the vehicle bounce, due to a phase difference with respect to the characteristics of a suspension system or powertrain while the vehicle is running.

On the other hand, decreasing the modulus of elasticity of the mounting device has the problem of vibration and noise transmission from the engine to the vehicle body when the engine is idle or while the vehicle is running.

Accordingly, a fluid engine mounting device using fluid was developed, and this fluid engine mounting device is excellent in absorbing vibrations in vertical direction (z direction) through fluid movement. In horizontal direction (x or y direction), however, vibration and noise are generated in the idle state or rapid acceleration state, due to spring characteristics.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vibration absorbing mounting device which affords a driver a quiet and comfortable ride in the idle state or rapid acceleration state by efficiently reducing both vertical and horizontal vibrations.

In an aspect of the present invention, a vibration absorbing mounting device may include an outer housing, one side of which is fixed to a vehicle body, and which may have an insertion hole on a top thereof, a mounting shaft, a lower portion of which is inserted into the outer housing through the insertion hole, a core surrounding an outer circumferential surface of the lower portion of the mounting shaft, a bottom of the core projecting downward, a first nozzle valve spaced apart from and disposed below the core, an inner housing spaced apart from one side and the other side of the core, with the first nozzle valve being mounted to a bottom of the inner housing, a chamber separator, a top of which is fixed to a bottom end of the core, and a bottom end of which is brought into close contact with and slide on a top surface of the first nozzle valve, and which separates a first chamber formed between the one side of the core and the inner housing and a second chamber formed between the other side of the core and the inner housing, and an elastic member formed in a space between the core and the inner housing and between the inner housing and the outer housing, excluding the first chamber and the second chamber, wherein fluid is filled in the first chamber and the second chamber, and a first nozzle fluidly-connecting the first and second chambers is formed in the first nozzle valve.

The vibration absorbing mounting device may include a diaphragm that is mounted at a bottom of the outer housing, and a second nozzle valve that is fixed and mounted to the inside of the outer housing between the first nozzle valve and the diaphragm, with a third chamber being formed above the second nozzle valve and a fourth chamber formed below the second nozzle valve, and may include a second nozzle fluidly-connecting the third chamber and the fourth chamber, wherein a fluid is filled in the third chamber and the fourth chamber.

A membrane is disposed at a center of the second nozzle valve and actuated depending on a pressure of the third chamber or the fourth chamber.

A mounting bracket is disposed within the fourth chamber, and the second nozzle valve is mounted and fixed to a top of the mounting bracket.

When the mounting shaft, the core, and the chamber separator move horizontally with respect to the inner housing, the bottom end of the chamber separator slides on the top surface of the first nozzle valve and a space of the first chamber or second chamber is reduced, so that the fluid filled therein moves to the second chamber or the first chamber through the first nozzle formed in the first nozzle valve and thereby attenuates horizontal vibration.

When the mounting shaft, the core, and the chamber separator move vertically with respect to the outer housing, a space of the third chamber or the fourth chamber is reduced, so that the fluid filled therein moves to the fourth chamber or the third chamber through the second nozzle formed in the second nozzle valve and thereby attenuates vertical vibration.

The membrane contracts or expands depending on the pressure of the fourth chamber.

The mounting bracket supports one side of an engine that produces torque by internal combustion.

The mounting bracket supports one side of an engine that produces torque by an electric motor.

The elastic member is made of a rubber material.

The diaphragm contracts or expands depending on a pressure of the fourth chamber.

As described above, a compression chamber and an expansion chamber (first and second chambers) are formed in the horizontal x-axis direction in the vibration absorbing mounting device according to the exemplary embodiment of the present invention, and noise and vibration generated while the vehicle is running or when the engine is idle are reduced by the flow of fluid between the first and second chambers.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
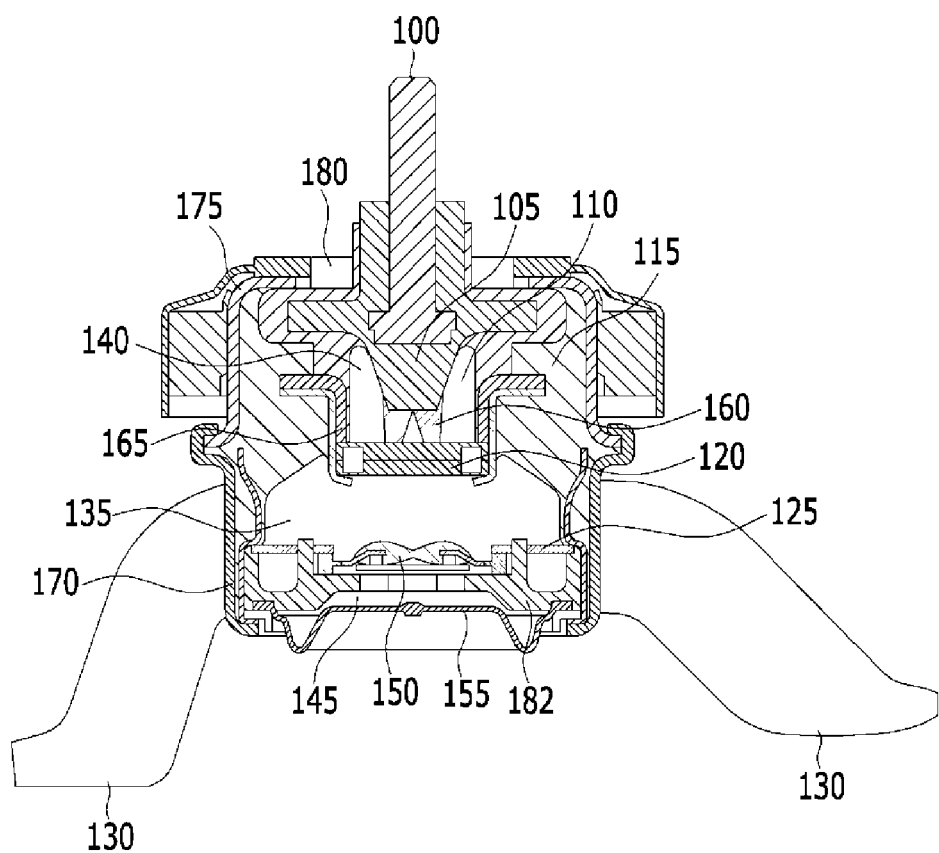
FIG. 1 is a cross-sectional view of a vibration absorbing mounting device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
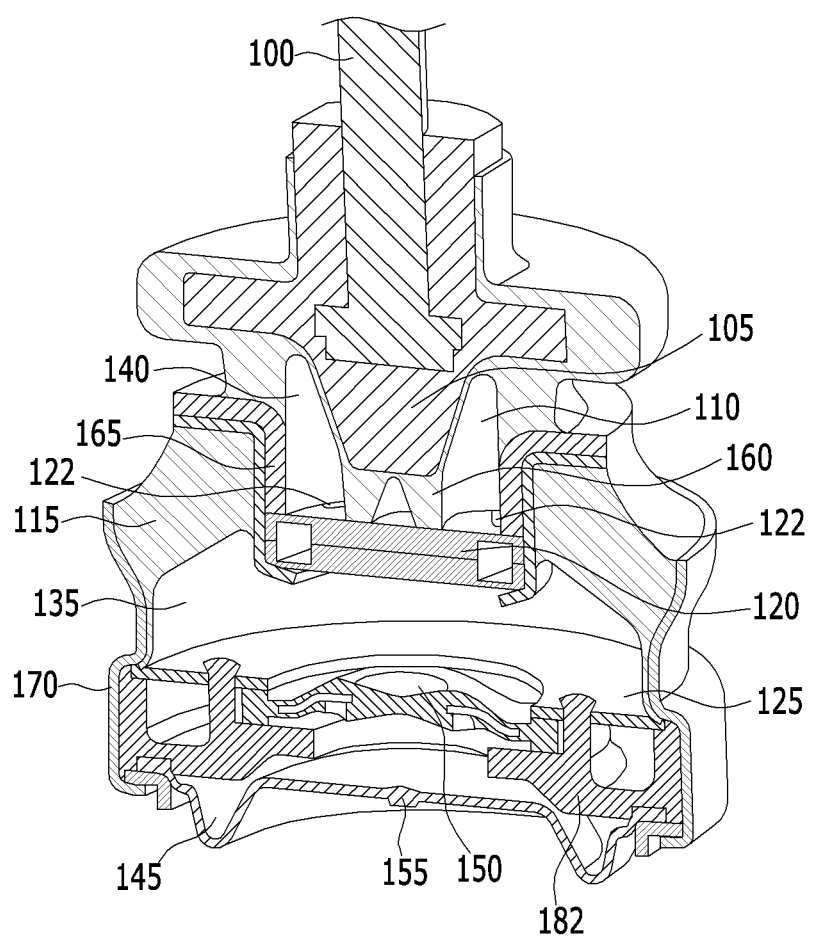
FIG. 2 is a perspective view showing a cross-section of the vibration absorbing mounting device according to the exemplary embodiment of the present invention.

FIG. 1 is a cross-sectional view of a vibration absorbing mounting device according to an exemplary embodiment of the present invention. FIG. 2 is a perspective view showing a cross-section of the vibration absorbing mounting device according to the exemplary embodiment of the present invention.

Referring to FIG. 1, the vibration absorbing mounting device includes a vehicle body 130, a lower outer housing 170, an upper outer housing 175, a mounting shaft 100, a core 105, a chamber separator 160, a first nozzle valve 120, an inner housing 165, a rubber body 115, a second nozzle valve 125, a mounting bracket 182, a membrane 150, and a diaphragm 155.

The upper outer housing 175 and the lower outer housing 170 are bonded and fixed together to form an inner space, and the outside of the lower outer housing 170 is bonded and fixed to the vehicle body 130.

An insertion hole 180 open at the top is formed in the center on the top of the upper outer housing 175, and a lower portion of the mounting shaft 100 is inserted into the insertion hole 180. A core 105 is formed on the outer circumferential surface of the lower portion of the mounting shaft 100, and the bottom of the core 105 extends downward.

An inner housing 165 is spaced apart from the sides of the core 105 by a predetermined distance, and the inner housing 165 is open at the bottom. The first nozzle valve 120 is fixed and mounted to a hole that is open at the bottom of the inner housing 165. Here, the inner circumferential surface of the inner housing 165 and the outer circumferential surface of the first nozzle valve 120 are sealed together.

The chamber separator 160 is disposed at the center of the top surface of the first nozzle valve 120, under the core 105, and the top of the chamber separator 160 is fixed to the bottom end of the core 105 and the bottom end of the chamber separator 160 is brought into close contact with and slide on the top surface of the first nozzle valve 120.

A first chamber 140 and a second chamber 110 are formed between the inner circumferential surface of the inner housing 165 and the sides of the core 105, with the chamber separator 160 interposed between them. The rubber body 115 is formed between the inner circumferential surface of the upper outer housing 175 and the outer circumferential surface of the inner housing 165 and between the outer circumferential surface of the core 105 and the inner circumferential surface of the upper outer housing 175, excluding the first chamber 140 and the second chamber 110.

The rubber body 115 is an elastic member, which enables the core 105 and the mounting shaft 100 to move in a vertical or horizontal direction with respect to the upper outer housing 175, the lower outer housing 170, and the vehicle body 130.

In the exemplary embodiment of the present invention, fluid is filled in the first chamber 140 and the second chamber 110, and the fluid in the first chamber 140 may move to the second chamber 110 through the first nozzle valve 120 or the fluid in the second chamber 110 may move to the first chamber 140 through the first nozzle valve 120, depending on the pressure or volume of the first chamber 140 or second chamber 110.

For example, when the mounting shaft 100 and the core 105 move to the right with respect to the inner housing 165, the chamber separator 160 slides to the right on the first nozzle valve 120, and the fluid in the second chamber 110 moves to the first chamber 140 through the nozzle of the first nozzle valve 120.

At this time, the width or frequency of vibration changes while the fluid is moving from the second chamber 110 to the first chamber 140 so that vibration and noise can be attenuated effectively overall. That is, horizontal x- and y-axis vibration is effectively attenuated.

A second nozzle valve 125 is mounted below the first nozzle valve 120, with a set distance between them, within the lower outer housing 170. A third chamber 135 is formed above the second nozzle valve 125, and a fourth chamber 145 is formed below the second nozzle valve 125.

The second nozzle valve 125 is installed on the top of the mounting bracket 182. The mounting bracket 182 is fixed and mounted to the inside of the fourth chamber 145, within the lower outer housing 170. A membrane 150 is installed at the center on the top of the mounting bracket 182, and the membrane 150 has a structure that closes a hole formed at the center of the second nozzle valve 125.

Also, the membrane 150 moves upward or downward depending on the pressure or volume between the third chamber 135 and the fourth chamber 145.

The bottom center of the lower outer housing 170 is open at the bottom. The bottom hole of the lower outer housing 170 is closed by the diaphragm 155, and the fourth chamber 145 is formed between the second nozzle valve 125 and the diaphragm 155. Here, the diaphragm 155 may contract or expand depending on the pressure or volume of the fourth chamber 145.

In the exemplary embodiment of the present invention, the mounting shaft 100, the core 105, the chamber separator 160, the inner housing 165, and the first nozzle valve 120 move up and down with respect to the lower outer housing 170.

Then, the fluid filled in the third chamber 135 or fourth chamber 145 moves to the fourth chamber 145 or the third chamber 135 through second nozzles 128 of the second nozzle valve 125. As the fluid moves, vertical vibration is attenuated.

Referring to FIG. 2, first nozzles 122 are formed in the first nozzle valve 120. Preferably, the first nozzle 122 is configured to connect the first chamber 140 and the second chamber 110, no matter which direction the chamber separator 160 moves on the first nozzle valve 120.

Figure 3:
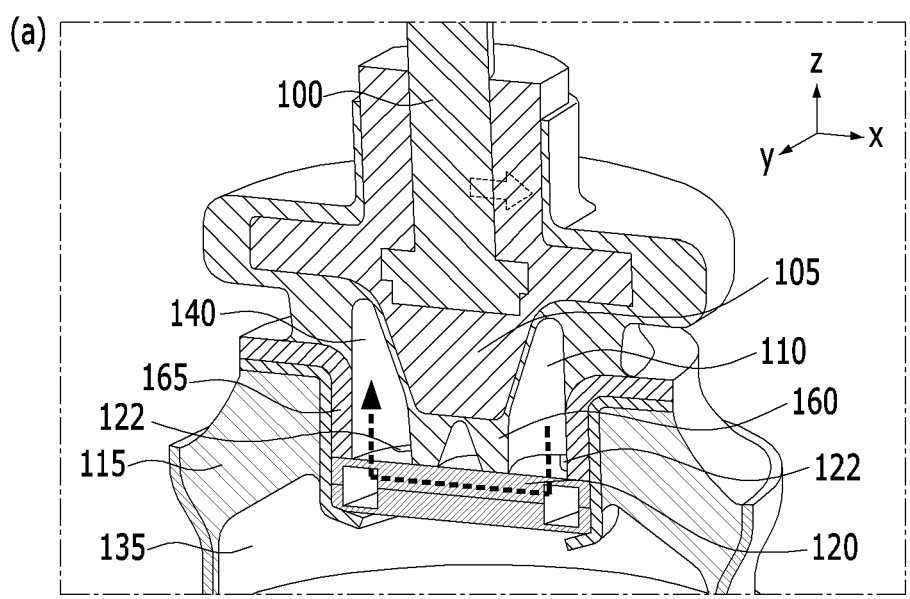
FIG. 3 is a cross-sectional perspective view showing when the vibration absorbing mounting device according to the exemplary embodiment of the present invention is absorbing horizontal vibration.
Figure 3:
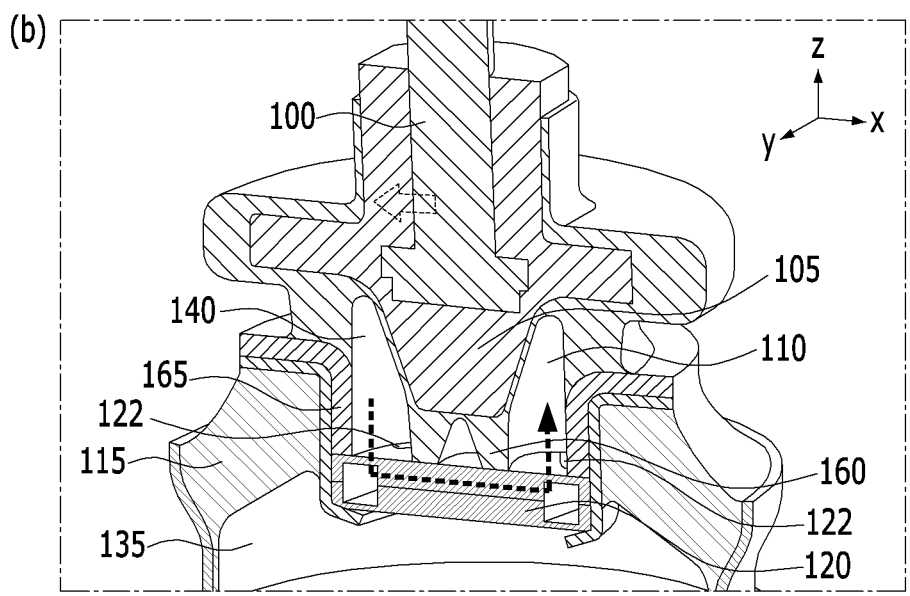

FIG. 3 is a cross-sectional perspective view showing when the vibration absorbing mounting device according to the exemplary embodiment of the present invention is absorbing horizontal vibration.

Referring to (a) of FIG. 3, when the mounting shaft 100, the core 105, and the chamber separator 160 move in the x-axis direction with respect to the inner housing 165, the volume of the first chamber 140 increases and the volume of the second chamber 110 decreases.

Therefore, the pressure of the second chamber 110 rises and the pressure of the first chamber 140 falls, thus causing the fluid in the second chamber 110 to move to the first chamber 140 through the first nozzle 122 of the first nozzle valve 120.

Although the exemplary embodiment of the present invention has been described regarding the movement of the chamber separator 160 on the first nozzle valve 120 in the x-axis direction, the present invention is not limited thereto and the chamber separator 160 may move in the y-axis direction. Also, the chamber separator 160 may move in any direction on the x-y plane of the first nozzle valve 120.

Referring to (b) of FIG. 3, when the mounting shaft 100, the core 105, and the chamber separator 160 move in the x-axis direction with respect to the inner housing 165, the volume of the first chamber 140 decreases, and the volume of the second chamber 110 increases.

Therefore, the pressure of the second chamber 110 falls and the pressure of the first chamber 140 rises, thus causing the fluid in the first chamber 140 to move to the second chamber 110 through the first nozzle 122 of the first nozzle valve 120.

Figure 4:
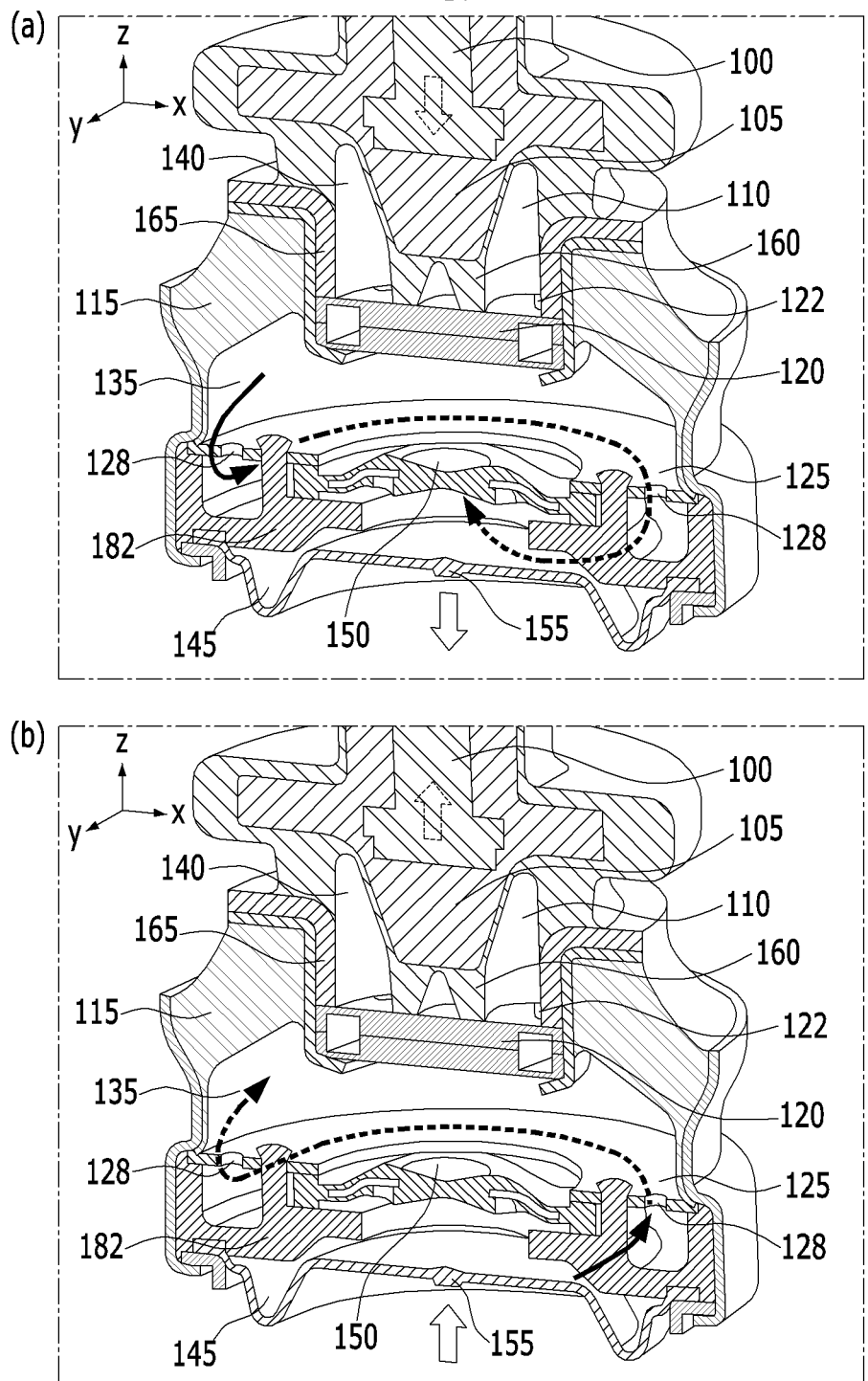
FIG. 4 is a cross-sectional perspective view showing when the vibration absorbing mounting device according to the exemplary embodiment of the present invention is absorbing vertical vibration.

FIG. 4 is a cross-sectional perspective view showing when the vibration absorbing mounting device according to the exemplary embodiment of the present invention is absorbing vertical vibration.

Referring to (a) of FIG. 4, the mounting shaft 100, the core 105, the chamber separator 160, the first nozzle valve 120, and the inner housing 165 descend along the z-axis with respect to the lower outer housing 170.

Then, the volume of the third chamber 135 decreases, and the fluid filled in the third chamber 135 flows into the fourth chamber 145 through the second nozzle valve 125.

Here, the volume of the fourth chamber 145 increases as the membrane 150 and the diaphragm 155 are deformed in shape. As the fluid in the third chamber 135 moves to the fourth chamber 145 through the second nozzle valve 125, vibration is effectively attenuated.

Referring to (b) of FIG. 4, when the mounting shaft 100, the core 105, the chamber separator 160, the first nozzle valve 120, and the inner housing 165 ascend along the z-axis with respect to the lower outer housing 170, the volume of the third chamber 135 increases and the fluid filled in the fourth chamber 145 flows into the third chamber 135 through the second nozzle valve 125.

Here, the volume of the fourth chamber 145 decreases as the membrane 150 and the diaphragm 155 are deformed in shape. As the fluid in the fourth chamber 145 moves to the third chamber through the second nozzle valve 125, vibration is effectively attenuated.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vibration absorbing mounting device comprising:
  an outer housing, one side of which is fixed to a vehicle body, and which has an insertion hole on a top thereof;
  a mounting shaft, a lower portion of which is inserted into the outer housing through the insertion hole;
  a core surrounding an outer circumferential surface of the lower portion of the mounting shaft, a bottom of the core projecting downward;
  a first nozzle valve spaced apart from and disposed below the core;
  an inner housing spaced apart from one side and the other side of the core, with the first nozzle valve being mounted to a bottom of the inner housing;
  a chamber separator, a top of which is fixed to a bottom end of the core, and a bottom end of which is brought into close contact with and slide on a top surface of the first nozzle valve, and which separates a first chamber formed between the one side of the core and the inner housing and a second chamber formed between the other side of the core and the inner housing;
  an elastic member formed in a space between the core and the inner housing and between the inner housing and the outer housing, excluding the first chamber and the second chamber,
  a diaphragm that is mounted at a bottom of the outer housing; and
  a second nozzle valve that is fixed and mounted to the inside of the outer housing between the first nozzle valve and the diaphragm, with a third chamber being formed above the second nozzle valve and a fourth chamber formed below the second nozzle valve, and includes a second nozzle fluidly-connecting the third chamber and the fourth chamber,
  wherein fluid is filled in the third chamber and the fourth chamber, and fluid is filled in the first chamber and the second chamber, and a first nozzle fluidly-connecting the first and second chambers is formed in the first nozzle valve,
  when the mounting shaft, the core, and the chamber separator move horizontally with respect to the inner housing, the bottom end of the chamber separator slides on the top surface of the first nozzle valve and a space of the first chamber or second chamber is reduced, so that the fluid filled therein moves to the second chamber or the first chamber through the first nozzle formed in the first nozzle valve and thereby attenuates horizontal vibration, and when the mounting shaft, the core, and the chamber separator move vertically with respect to the outer housing, a space of the third chamber or the fourth chamber is reduced, so that the fluid filled therein moves to the fourth chamber or the third chamber through the second nozzle formed in the second nozzle valve and thereby attenuates vertical vibration.

2. The vibration absorbing mounting device of claim 1, wherein a membrane is disposed at a center of the second nozzle valve and actuated depending on a pressure of the third chamber or the fourth chamber.

3. The vibration absorbing mounting device of claim 1, wherein a mounting bracket is disposed within the fourth chamber, and the second nozzle valve is mounted and fixed to a top of the mounting bracket.

4. The vibration absorbing mounting device of claim 2, wherein the membrane contracts or expands depending on the pressure of the fourth chamber.

5. The vibration absorbing mounting device of claim 3, wherein the mounting bracket supports one side of an engine that produces torque by internal combustion.

6. The vibration absorbing mounting device of claim 3, wherein the mounting bracket supports one side of an engine that produces torque by an electric motor.

7. The vibration absorbing mounting device of claim 1, wherein the elastic member is made of a rubber material.

8. The vibration absorbing mounting device of claim 1, wherein the diaphragm contracts or expands depending on a pressure of the fourth chamber.

* * * * *